United States Patent
Grossetete

(10) Patent No.: US 9,400,940 B2
(45) Date of Patent: Jul. 26, 2016

(54) METHOD OF PROCESSING IMAGES, NOTABLY FROM NIGHT VISION SYSTEMS AND ASSOCIATED SYSTEM

(71) Applicant: THALES, Neuilly sur Seine (FR)

(72) Inventor: Matthieu Grossetete, Cenon (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 14/576,128

(22) Filed: Dec. 18, 2014

(65) Prior Publication Data

US 2015/0169986 A1    Jun. 18, 2015

(30) Foreign Application Priority Data

Dec. 18, 2013    (FR) ...................................... 13 02980

(51) Int. Cl.
| | |
|---|---|
| *G06K 9/36* | (2006.01) |
| *G06K 9/52* | (2006.01) |
| *G06K 9/46* | (2006.01) |
| *G06T 5/00* | (2006.01) |

(52) U.S. Cl.
CPC ................ *G06K 9/52* (2013.01); *G06K 9/4661* (2013.01); *G06T 5/00* (2013.01); *G06T 5/008* (2013.01); *G06T 2207/20012* (2013.01); *G06T 2207/20208* (2013.01); *G06T 2207/30212* (2013.01)

(58) Field of Classification Search
None
See application file for complete search history.

(56) References Cited

U.S. PATENT DOCUMENTS

2004/0042676 A1    3/2004    Srinivasa
2012/0301050 A1    11/2012    Wakazono

OTHER PUBLICATIONS

Zhang et al., "Adaptive Local Contrast Enhancement for the Visualization of High Dynamic Range Images"; IEEE, 2008, 5 pages total (1 bib sheet + 4 pages of article).*
RB Lufkin, et al., "Dynamic-range compression in surface-coil MRI," American Journal of Roentgenology, XP055139230, vol. 147, No. 2, pp. 379-382 (Aug. 1, 1986).
French Search Report for French Counterpart Application No. FR 1302980, 9 pgs. (Sep. 16, 2014).

* cited by examiner

*Primary Examiner* — Brian P Werner
(74) *Attorney, Agent, or Firm* — Blakely, Sokoloff, Taylor & Zafman LLP

(57) ABSTRACT

The general field of the invention is that of the methods of processing an initial digital image $I_{IN}(p)$ made up of pixels (p). The method according to the invention comprises the following successive steps:

Step 1: calculating the logarithm of the initial image in order to obtain a first intermediate image $Log(I_{IN}(p))$;

Step 2: filtering said first intermediate image using a low-frequency filter in order to obtain a second intermediate image $BF(p)$;

Step 3: determining the value of the minimum intensity and the value of the maximum intensity in the low-frequency image;

Step 4: calculating a third intermediate image $Log(I_{OUT}(p))$ using the following linear combination:

$Log(I_{OUT}(p)) = [Log(I_{IN}(p) - BF(p)] \cdot [K1 \cdot BF(p) + K2] + K3 \cdot BF(p) + K4$ K1, K2, K3 and K4 being constants;

Step 5: calculating the final image $I_{OUT}(p)$ by applying the exponential function to the third intermediate image.

5 Claims, 2 Drawing Sheets

METHOD OF PROCESSING IMAGES, NOTABLY FROM NIGHT VISION SYSTEMS AND ASSOCIATED SYSTEM

BACKGROUND OF THE INVENTION

1. Field of the Invention

The field of the invention is that of the methods for improving images from real-time and high dynamic low-light level digital video imaging systems. These imaging systems are notably used at night. There are numerous uses, in particular in the aeronautical field.

2. Description of the Prior Art

This type of system provides images which are not necessarily of extremely good quality, given the low luminance level of the scene. There are a certain number of image processing techniques for increasing the quality of the image, in particular by increasing or enhancing the contrast in the low grey levels.

The following contrast enhancement methods are noted:
enhancement based on global histogram rearrangement;
enhancement based on local histogram rearrangement;
enhancement based on frequency approaches;
enhancement based on illumination/reflectance approaches;
enhancement based on the "Retinex" human eye biological function.

However, the images from the low-light level digital video imaging systems are particularly tricky to process insofar as they are at high resolution, highly dynamic, extremely noisy and delivered at a high rate. Therefore, the conventional image processing techniques mentioned above all have one or more of the following disadvantages:
degradation of the scenes having extremely wide luminous dynamics by the saturation of the overexposed areas of the scene;
large increase in the already present digital noise due to the low-light level environment;
appearance of processing "artefacts" restricting the scene comprehension;
reduction in the resolution of the initial image;
processing incompatibility with a high image rate real-time operation;
no preservation of the overall appearance of the scene.

SUMMARY OF THE INVENTION

The image processing method according to the invention does not have these disadvantages, it is a homomorphic filtering method. Indeed, the processed image takes into account the initial image and the low-frequency components of this image such as to increase the contrast of the image without increasing the noise thereof, the final image, therefore, being more easily legible. Moreover this algorithm is particularly suitable for the enhancement of contrast of an image within the context of image dynamics matching. Noted, for example, is the transition from 10 bit, or more, coded image dynamics coming from the sensor to an 8 bit coded final image intended to be displayed on an imaging device. Indeed, since the processing algorithm is based on calculations using floating point or fixed point of chosen depth for real-time appearances, it is then possible to profit from the entire dynamics offered by the sensor during processing, then to impose output dynamics fixed to the algorithm during the last conversion. Therefore, this algorithm can, advantageously, be carried out within the context of replacing a conversion table matching dynamics between a sensing device and the display thereof.

More precisely, the subject matter of the invention is a method of processing an initial digital image $I_{IN}(p)$ made up of pixels (p), said method comprising at least the following successive steps:

Step 1: calculating the logarithm of the initial image in order to obtain a first intermediate image $Log(I_{IN}(p))$;

Step 2: filtering said first intermediate image using a low-frequency filter in order to obtain a second intermediate image $BF(p)$;

Step 3: determining the value of the minimum intensity ($Min_{BF}$) and the value of the maximum intensity ($Max_{BF}$) in the low-frequency image obtained in the previous step;

Step 4: calculating a third intermediate image $Log(I_{OUT}(p))$ using the following linear combination:

$$Log(I_{OUT}(p)) = [Log(I_{IN}(p)) - BF(p)] \cdot [K1 \cdot BF(p) + K2] + K3 \cdot BF(p) + K4$$

K1, K2, K3 and K4 being constants dependent upon the difference between the value of the maximum intensity ($Max_{BF}$) and the value of the minimum intensity ($Min_{BF}$) and the value of the minimum intensity ($Min_{BF}$);

Step 5: calculating the final image $I_{OUT}(p)$ by applying the exponential function to the third intermediate image $Log(I_{OUT}(p))$.

Advantageously, the filter used in step 2 is a Gaussian filter, the sigma of which is greater than 30.

Advantageously, with some processing architectures, step 2 includes the following three sub-steps:

Step 2.1: pyramidal decomposition of the first intermediate image into first sub-sampled intermediate images $Log(I_{INSSE}(p))$;

Step 2.2: filtering a first sub-sampled intermediate image using the low-frequency filter in order to obtain a second sub-sampled intermediate image $BF(p)_{SSE}$;

Step 2.3: pyramidal recomposition of the second sub-sampled intermediate image in order to obtain the second intermediate image $BF(p)$.

Advantageously, in the case where the method is used to process a second digital image immediately succeeding a first digital image, both images belonging to a video sequence, at step 3 of the method of processing the second digital image, the value of the minimum intensity ($Min_{BF}$) and the value of the maximum intensity ($Max_{BF}$) of the second digital image are chosen to be equal to the value of the minimum intensity ($Min_{BF}$) and the value of the maximum intensity ($Max_{BF}$) of the first digital image.

The invention also relates to a night vision system including a low-light level image capturing device and means for processing the images from said device, characterized in that said means implement the processing method described above.

BRIEF DESCRIPTION OF THE DRAWINGS

The invention will be better understood and other advantages will emerge upon reading the following nonlimiting description with reference to the appended figures wherein.

DETAILED DESCRIPTION

A digital image is made up of an array of pixels p arranged in rows and in columns. Each row and each column can include several hundred to several thousand pixels. Each pixel is digitally coded. In the case of a monochrome image, the digital coding corresponds to a grey level or "GL". In the following description, it is assumed that the image is monochrome. The method is used, of course, for coloured images, a coloured image being the superposition of three monochrome images in three different spectral bands.

The image of a scene $I_{IN}(p)$ can be described as the product of an illumination or lighting component $E(p)$ and a reflectance component $R(p)$. Therefore, an initial image $I_{IN}(p)$ can be written as:

$$I_{IN}(p)=R(p) \cdot E(p)$$

The core of the method is to separately and independently process these two components, then recombine them in order to obtain a better quality processed image. The procedure is as follows. Firstly, a logarithmic transformation "Log" is applied to the image. Therefore, this gives:

$$\mathrm{Log}(I_{IN}(p))=\mathrm{Log}(R(p) \cdot E(p))=\mathrm{Log}(R(p))+\mathrm{Log}(E(p))$$

according to the well-known properties of the logarithms.

Generally, the reflectance component includes the high frequencies and the illumination component includes the low frequencies. Therefore, by using processing which selects the low frequencies, the illumination component $\mathrm{Log}(E(p))$ can be isolated and specific processing can be applied thereto which is intended, for example, to reduce the large illumination variations resulting from a dramatic variation in the gain of a capturing system. The processed components $\mathrm{Log}(R(p))$ and $\mathrm{Log}(E(p))$ are then recombined in order to obtain the following function $\mathrm{Log}(I_{out}(p))$, $I_{out}(p)$ corresponding to the logarithmic transformation of the final processed image. It is, therefore, sufficient to apply the exponential function to this logarithmic image in order to obtain the final processed image of "real" value, with a floating point or fixed point of sensibly chosen depth, which can be written as:

$$\mathrm{Exp}[\mathrm{Log}(I_{out}(p))]=I_{out}(p)$$

Then, all that needs to be done is to use a suitable conversion table to sample this real final image into a chosen dynamics image. Within the context of a vision system, these are the dynamics of the display.

Figure 1:
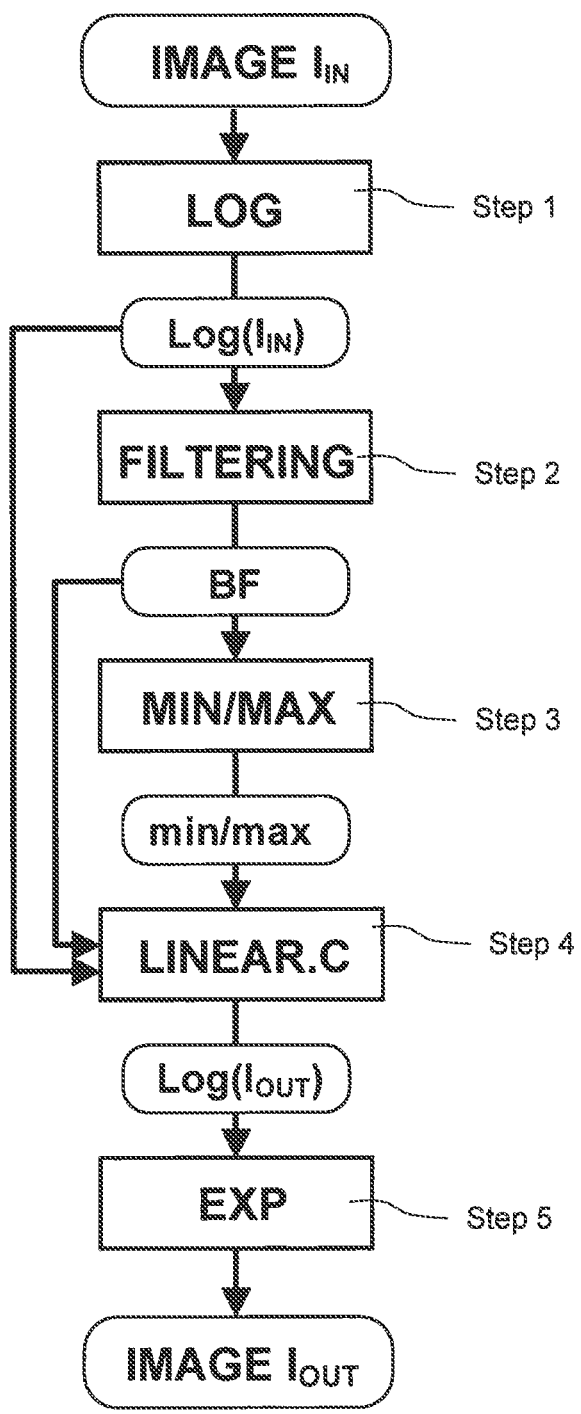
FIG. 1 shows the various steps of the image processing method according to the invention.

More precisely, FIG. 1 shows the various steps of the method for processing a pixellated digital image according to the invention. These are as follows:

Step 1 "LOG": calculating the logarithm of the initial image $I_{IN}(p)$ in order to obtain a first intermediate image $\mathrm{Log}(I_{IN})$. The logarithm calculated in this manner assigns to each pixel p "real" values which are simulated by numbers with a floating point or fixed point of a sensibly selected "depth". The depth corresponds to a selected number of bits.

Step 2 "FILTERING": filtering said first intermediate image $\mathrm{Log}(I_{IN}(p))$ using a low-frequency filter in order to obtain a second intermediate image $BF(p)$. The second intermediate image corresponds more or less to the illumination component of the image as seen above.

The filter used is preferably a Gaussian filter, the sigma of which is greater than 30. More precisely, this sigma is strongly dependent upon the angular resolution of the capturing system. In the context of the capturing systems of the current night vision systems, a "good" sigma is approximately 60. Filtering consists in convolving the first intermediate image with a Gaussian function. It is known that one of the properties of the Gaussian function is a Fourier transform which is also a Gaussian function. Therefore, this does not have any rebound in the frequency domain unlike other functions such as the "door" function, for example.

Step 3 "MIN/MAX": determining the value of the minimum intensity ($\mathrm{Min}_{BF}$) and the value of the maximum intensity ($\mathrm{Max}_{BF}$) in the pixels of the low-frequency image $BF(p)$ obtained in the previous step.

Step 4 "LINEAR.C": calculating a third intermediate image $\mathrm{Log}(I_{OUT}(p))$ using the following linear combination:

$$\mathrm{Log}(I_{OUT}(p))=[\mathrm{Log}(I_{IN}(p))-BF(p)] \cdot [K1 \cdot BF(p)+K2]+ K3 \cdot BF(p)+K4$$

K1, K2, K3 and K4 being first order dependent constants for:

the inverse of the difference between the value of the maximum intensity and the value of the minimum intensity which is: $1/(\mathrm{Max}_{BF}-\mathrm{Min}_{BF})$;

the value of the maximum intensity $\mathrm{Max}_{BF}$ and;

the value of the minimum intensity $\mathrm{Min}_{BF}$

For example, the constants K1, K2, K3 and K4 are:

$K1=(1-\alpha)/(\mathrm{Max}_{BF}-\mathrm{Min}_{BF})$ $K2=\alpha-K1 \cdot \mathrm{Min}_{BF}$ $K3=(\mathrm{Max}_{BF}-\beta)/(\mathrm{Max}_{BF}-\mathrm{Min}_{BF})$ $K4=\beta-K3 \cdot \mathrm{Min}_{BF}$ $\alpha$ and $\beta$ being adjustable constants.

This linear combination allows the reflectance component which is $[\mathrm{Log}(I_{IN}(p))-BF(p)]$ and the illumination component which is $BF(p)$ to be weighted separately, and account to be taken of the lighting amplitude which is $(\mathrm{Max}_{BF}-\mathrm{Min}_{BF})$ and of the lighting levels corresponding to the values of the maximum intensity $\mathrm{Max}_{BF}$ and of the minimum intensity $\mathrm{Min}_{BF}$.

Step 5 "EXP": calculating the final image $I_{OUT}(p)$ by applying the exponential function to the third intermediate image $\mathrm{Log}(I_{OUT}(p))$. This function is tabulated, for each pixel, to the "bits per pixel" or "BPP" precision required at processing output.

If the processed digital images are video images requiring real-time processing, it is imperative that the duration of the processing of each image is at the rate of acquisition, i.e. a few dozen milliseconds. In this case, it is important to optimize the calculating time and the various operations for processing the image. In this case, step 2 can include an image pyramidal decomposition sub-step. The pyramidal decomposition takes place in successive steps. At each step, adjacent pixels are grouped together in blocks including numbers of pixels that are increasingly greater according to grouping-together laws taking into account the intensity variations of each pixel. Therefore, the higher up the "pyramid", the fewer blocks it contains and the more the blocks comprise a large number of pixels. The pyramidal decomposition can occur with loss of information or without loss of information.

To find the initial image, each block is decomposed, in successive steps, until the original pixel number is found. It is understood that, if processing is carried out on the high rank blocks, then a large number of pixels can be processed simultaneously and the calculating times can be reduced.

Figure 2:
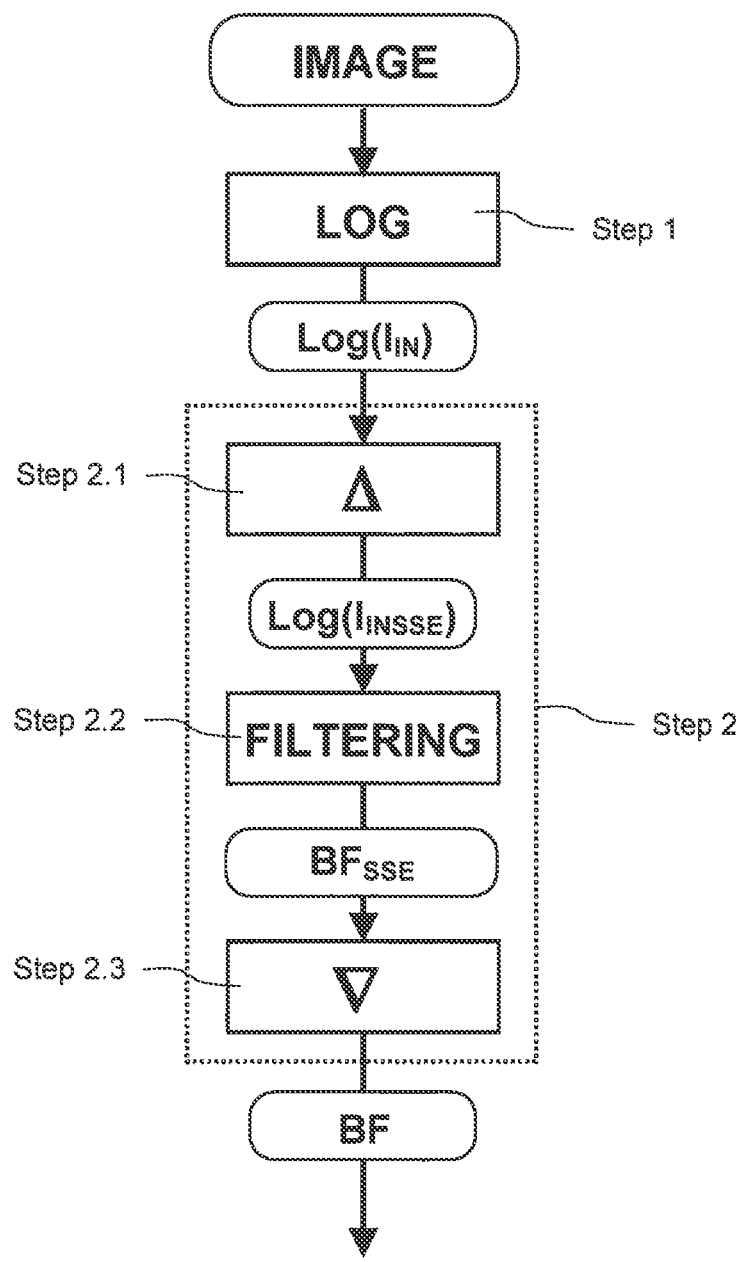
FIG. 2 shows an alternative of the second step of the image processing method according to the invention.

Step 2 uses this technique in order to reduce the processing times and make them compatible with real-time processing. It includes then, as indicated in FIG. 2, the following three sub-steps:

Step 2.1 "$\Delta$": pyramidal decomposition of the first intermediate image into first sub-sampled intermediate images $\mathrm{Log}(I_{INSSE}(p))$.

Step 2.2 "FILTERING": as above, filtering a first sub-sampled intermediate image using the low-frequency filter in order to obtain a second sub-sampled intermediate image $BF_{SSE}$.

Step 2.3 "V": pyramidal recomposition of the second sub-sampled intermediate image in order to obtain the second intermediate image with the reference, as above, BF.

The other image processing steps remain unchanged.

In the context of video processing, it is advantageous to parameterize the linear combination with the values of the minimum intensity ($Min_{BF}$) and the values of the maximum intensity ($Max_{BF}$) which are obtained in the immediately preceding image frame(s) in order to be able to speed up the image processing.

The processing method according to the invention is particularly suitable for the night vision systems including a low-light level image capturing device. Indeed, these systems provide generally noisy images, given the low level of lighting that is, therefore, necessary to process.

What is claimed is:

1. A method of processing an initial digital image $I_{IN}(p)$ made up of pixels (p), said method comprising:
   calculating a logarithm of the initial image in order to obtain a first intermediate image $Log(I_{IN}(p))$;
   filtering said first intermediate image using a low-frequency filter in order to obtain a second intermediate image $BF(p)$;
   determining a value of the minimum intensity ($Min_{BF}$) and a value of the maximum intensity ($Max_{BF}$) in the low-frequency image obtained from the filtering;
   calculating a third intermediate image $Log(I_{OUT}(p))$ using a linear combination comprising:

$$Log(I_{OUT}(p))=[Log(I_{IN}(p)-BF(p)]\cdot[K1\cdot BF(p)+K2]+K3\cdot BF(p)+K4,$$

K1, K2, K3 and K4 being constants dependent upon a difference between the value of the maximum intensity ($Max_{BF}$) and the value of the minimum intensity ($Min_{BF}$); and
   calculating a final image $I_{OUT}(p)$ by applying an exponential function to a third intermediate image $Log(I_{OUT}(p))$.

2. The method according to claim 1, wherein the low-frequency filter is a Gaussian filter, the sigma of which is greater than 30.

3. The method of claim 1, wherein the filtering further comprises:

performing pyramidal decomposition of the first intermediate image into first sub-sampled intermediate images $Log(I_{INSSE}(p))$;
filtering a first sub-sampled intermediate image using the low-frequency filter in order to obtain a second sub-sampled intermediate image $BF_{SSE}(p)$; and
performing pyramidal recomposition of the second sub-sampled intermediate image in order to obtain the second intermediate image $BF(p)$.

4. The method of claim 1, wherein, in the case where the method is used to process a second digital image immediately succeeding a first digital image, both images belonging to a video sequence, and wherein the value of the minimum intensity ($Min_{BF}$) and the value of the maximum intensity ($Max_{BF}$) of the second digital image are chosen to be equal to the value of the minimum intensity ($Min_{BF}$) and to the value of the maximum intensity ($Max_{BF}$) of the first digital image.

5. A night vision system comprising:
a low-light level image capturing device; and
a processor to process an initial digital image $I_{IN}(p)$ made up of pixels (p) captured from said device by:
   calculating a logarithm of the initial image in order to obtain a first intermediate image $Log(I_{IN}(p))$;
   filtering said first intermediate image using a low-frequency filter in order to obtain a second intermediate image $BF(p)$;
   determining a value of the minimum intensity ($Min_{BF}$) and a value of the maximum intensity ($Max_{BF}$) in the low-frequency image obtained from the filtering;
   calculating a third intermediate image $Log(I_{OUT}(p))$ using a linear combination comprising:

$$Log(I_{OUT}(p))=[Log(I_{In}(p)-BF(p)]\cdot[K1\cdot BF(p)+K2]+K3\cdot BF(p)+K4,$$

K1, K2, K3 and K4 being constants dependent upon a difference between the value of the maximum intensity ($Max_{BF}$) and the value of the minimum intensity ($Min_{BF}$);
   calculating a final image $I_{OUT}(p)$ by applying an exponential function to a third intermediate image $Log(I_{OUT}(p))$.

* * * * *